W. SOBEY.
DRAFT FRAME FOR GANG PLOWS.
APPLICATION FILED OCT. 4, 1912.
1,187,559.
Patented June 20, 1916.
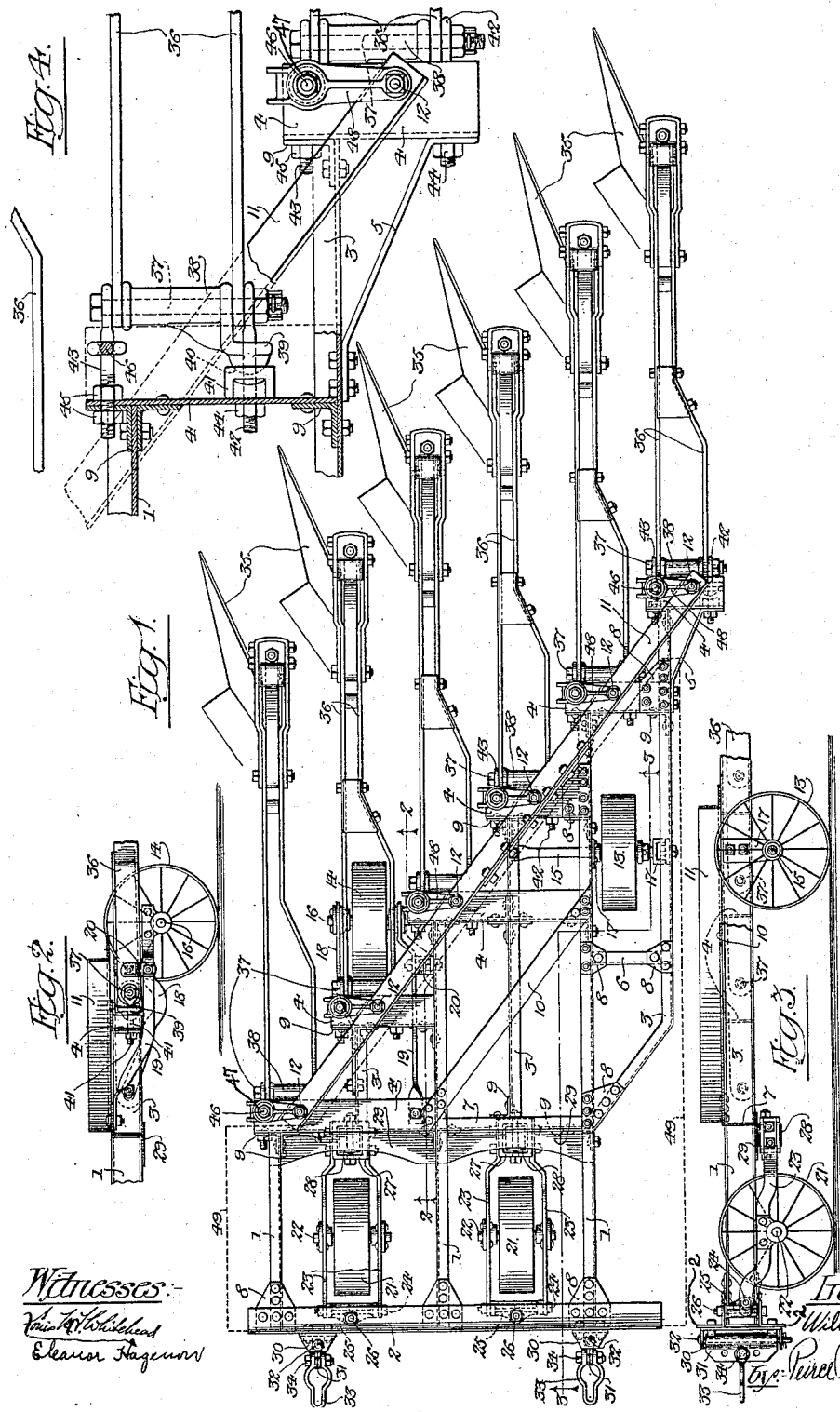

UNITED STATES PATENT OFFICE.

WILLIAM SOBEY, OF RACINE, WISCONSIN, ASSIGNOR TO J. I. CASE PLOW WORKS, OF RACINE, WISCONSIN, A CORPORATION.

DRAFT-FRAME FOR GANG-PLOWS.

1,187,559.    Specification of Letters Patent.    Patented June 20, 1916.

Original application filed May 25, 1911, Serial No. 629,269. Divided and this application filed October 4, 1912. Serial No. 723,911.

*To all whom it may concern:*

Be it known that I, WILLIAM SOBEY, a citizen of the United States, and a resident of Racine, county of Racine, and State of Wisconsin, have invented certain new and useful Improvements in Draft-Frames for Gang-Plows, of which the following is a full, clear, and exact description.

The invention relates to gang plows adapted for use with traction engines and seeks to provide an improved draft frame for such plows of simple, strong construction.

The invention consists in the features of improvement hereinafter set forth, illustrated in the accompanying drawing, and more particularly pointed out in the appended claims.

The present application is a division of an application filed by me in the United States Patent Office May 25, 1911, Serial No. 629,269.

In the drawings, Figure 1 is a plan view of the improved draft frame. Figs. 2 and 3 are vertical sections on the lines 2—2 and 3—3, respectively, of Fig. 1. Fig. 4 is a partial plan view on an enlarged scale illustrating the construction of the rear portion of the draft frame to which the plows are connected.

The drawing illustrates a gang or traction plow having six plow bodies, but it will be understood that the invention is adapted to a greater or less number. The draft frame is substantially triangular in section and comprises a series of longitudinal frame bars connected at their front and rear ends by a suitable transverse bar. Preferably, there is one of these longitudinal bars for each plow and these bars are preferably formed of channel iron. In the form shown, three of these longitudinal frame bars 1 are connected at their forward ends by upper and lower transverse angle bars 2. A second series of longitudinal frame bars 3 are alternately arranged with respect to the longitudinal bars 1 and terminate short of the forward ends thereof. The rear ends of the longitudinal bars 1 and 3 terminate progressively at different distances from the front transverse bars 2, and are connected by a series of short transverse bars 4 which are preferably formed of heavy angle iron. These short, transverse angle bars 4 form an inclined series of steps at the rear portion of the draft frame and each bar has an upper horizontal flange and a vertically depending flange (see Fig. 2). Each of these step angle bars is connected to and extends across the rear end of one of the longitudinal frame bars. The first step bar 4 is connected to the first two longitudinal bars 1 and to the forward end of the intermediate longitudinal bar 3. Each of the other step angle bars, except the last one of the series, is connected to and extends across the end of one of the longitudinal bars and is also connected to the side of the next adjacent longitudinal bar. The outer end of the last step bar is connected to the outside longitudinal bar 3 by an inclined brace 5. The forward end of this outside bar 3 is bent inwardly and connected to the adjacent bar 1, and it is also preferably connected to this bar by a transverse brace 6. The left hand outer bar 1 and the center longitudinal bar 1 are connected by a transverse channel bar 7 arranged in line with the first step angle bar 4 and the channel bar 7 is also connected to the forward end of the intermediate longitudinal bar 3. The joints between the several bars are braced by fillet plates 8 and angle clips 9. A short inclined brace 10 connects the two left hand longitudinal frame bars 1 and a long, inclined, bracing angle bar 11 extends over the horizontal flanges of the step bars 4 and is connected thereto by bolts 12.

The rear portion of the draft frame is supported on wheels 13 and 14 mounted respectively on shafts 15 and 16. The shaft 15 is carried by a series of brackets 17 that depend from three longitudinal bars at the left hand side of the frame. The shaft 16 is mounted in the rear ends of a pair of drag bars 18 and 19 which extend beneath and are bent around the connection between the frame and the second plow of the gang. The forward end of the bar 18 is connected to the first longitudinal channel bar 3 and the forward end of the bar 19 is connected to the horizontal flange of the first step bar 4. The drag bar 19 is also connected to the central longitudinal bar 1 by a depending strip 20.

The forward portion of the draft frame is mounted on two caster wheels 21 of similar construction. These caster wheels are carried upon shafts or axles 22 each of which is mounted at its ends upon a pair of bars 23. The forward ends of each pair of bars are connected, in the preferred form shown, by a horizontal pivot 24 to a bracket 25 which is arranged between the front transverse bars 2 and is centrally pivoted thereto by a vertical bolt 26. The rear ends of each pair of bars 23 are bent inwardly and carry a rectangular frame 27 within which is mounted a roller 28 having a horizontal, longitudinally extending axis and engaging a portion of the draft frame. The caster wheels, in the construction shown, are arranged between the forward ends of the longitudinal bars 1 and the rollers 28 engage transverse plates 29 secured to these bars below the transverse brace bar 7 and the first transverse step bar 4. The caster wheels swing upon the vertical pivot bolts to facilitate the turning of the traction frame and, in the construction shown, the wheels can also swing vertically upon the horizontal pivots 24 and thus remain in contact with the ground in passing over irregularities thereof. This arrangement relieves the strain which would otherwise be brought upon the connection between the frame and the caster wheels.

Two or more vertical, U-shaped clips 30 are adjustably bolted to the front faces of the draft bars 2 and carry clevises. Each clevis comprises a part 31 connected to the clip 30 by a vertical pivot bolt 32 and a link 33 adjustably and pivotally connected to the part 31 by a horizontal bolt 34.

The plows of the gang are arranged in an inclined series and the beams thereof are connected at their forward ends to the inclined series of step bars 4 of the traction frame with the several plows of the gang in line with the longitudinal frame bars 1 and 3. Suitable couplings are provided for securely connecting the forward ends of the plow beams and the step angle bars. The couplings shown are described and claimed in an application filed by me in the United States Patent Office on March 20th, 1912, Serial No. 685,080.

As illustrated, each plow body 35 is provided with a beam formed of two bars 36 which are spaced from each other at their rear ends and somewhat farther apart at their forward ends. A horizontal pivot bolt 37 extends through the forward ends of the pair of beam bars 36 and through an intermediate sleeve 38. As shown in Fig. 4, the sleeve is provided at one end with a vertically and laterally projecting arm 39 terminating in a semi-spherical head or ball 40. This ball sits within a socket formed in a member 41 which is arranged within the angle of the step bar 4 and abuts against the vertical and horizontal flanges thereof. A pair of eye-bolts 42 and 43 engage the ends of the pivot bolt 37 outside of the beam bars 36 and extend forwardly therefrom through the vertical flange of the step bar 4. The left hand eye bolt 42 extends through openings in the ball and socket members 40 and 41 and a nut 44 threaded on the forward end of the bolt engages the front face of the step bar. This bolt holds the ball and socket members in engagement and in the position shown, with the broad, flat, upper face of the socket member engaging the horizontal flange of the step bar 4, so that it cannot turn. The bolt 43 extends through the right hand end of the step bar which projects beyond the end of the longitudinal frame bar to which it is connected. This bolt also extends through one of the strengthening, angle clips 9. Set nuts 45 threaded on the bolt on opposite sides of the vertical flange of the step bar serve to adjustably connect the right hand end of the pivot bolt 37 to the angle bar. An eye bolt 46 engages the rear end of the eye bolt 43 and extends upwardly through the horizontal flange of the step bar 4. At its upper end, the bolt is provided with an adjusting nut 47. As set forth in the application referred to, this nut is held against longitudinal movement by a clamp piece or clip 48 which extends over the upper face of the angle bar and the horizontal flange of the bar 11. The clips 48 are held in position by bolts 12.

A platform of wood or the like is placed upon the draft frame, as indicated in dotted lines at 49 in Fig. 1, and the attendant who controls the raising and lowering of the plows stands on this platform. By this arrangement the plows are securely connected to the rear portion of the triangular draft frame and in line with the several longitudinal bars thereof. The construction is such that the frame is well adapted to resist the heavy strain brought thereon.

Other forms of couplings may be employed and changes may be made in the details set forth without departure from the essentials of the invention as defined in the claims.

I claim as my invention:

1. In a plow, a triangular draft frame comprising a series of longitudinal bars, transverse bars connecting the forward ends of said longitudinal bars, said longitudinal bars terminating progressively at different distances from the front of said frame, a series of short, transverse bars connecting the rear ends of said longitudinal bars and forming a rearwardly and laterally inclined series of steps at the rear portion of the frame, each of said step bars extending across the rear end of one of said longitudinal bars, an inclined brace bar connected to said step bars, supporting wheels for said frame and a number of trailing plows connected to said step bars substantially in line with said longitudinal bars, substantially as described.

2. In a plow, a triangular draft frame comprising a series of longitudinal bars, transverse bars connecting the forward ends of said longitudinal bars, a series of short transverse angle bars connecting the rear ends of said longitudinal bars forming a rearwardly and laterally inclined series of step bars having an upper horizontal flange and a depending vertical flange and extending across the rear end of one of said longitudinal bars, an inclined brace bar extending over and secured to the horizontal flanges of said step bars, supporting wheels for said frame, and a number of trailing plows connected to said step bars in line with said longitudinal bars, substantially as described.

3. In a gang plow, the triangular draft frame comprising a series of longitudinal bars terminating at their rear ends progressively at different distances from the front of said frame, each alternate longitudinal bar being extended forwardly beyond the ends of the other longitudinal bars, and transverse strengthening bars connecting the forward portions of said longitudinal bars, transverse draft bars connecting the forward ends of said longer longitudinal bars, a rearwardly and laterally inclined brace bar connecting the rear ends of said longitudinal bars, wheels supporting the rear portion of said frame, caster wheels connected to said draft bars, and a series of trailing plows connected to the rear portion of said frame, substantially as described.

WILLIAM SOBEY.

Witnesses:
STANLEY A. BREWER,
EDWARD E. WILLIAMS.

Copies of this patent may be obtained for five cents each, by addressing the "Commissioner of Patents Washington, D. C."